United States Patent [19]

Kizaki

[11] 4,216,850
[45] Aug. 12, 1980

[54] RETURN SPRING RETENTION FOR A VEHICLE DRUM BRAKE

[75] Inventor: Ziro Kizaki, Toyota, Japan

[73] Assignee: Toyota Jidosha Kogyo Kabushiki Kaisha, Aichi, Japan

[21] Appl. No.: 3,249

[22] Filed: Jan. 11, 1979

Related U.S. Application Data

[63] Continuation of Ser. No. 845,612, Oct. 26, 1977, abandoned.

[30] Foreign Application Priority Data

Jun. 13, 1977 [JP] Japan .................................. 52-69653

[51] Int. Cl.² .............................................. F16D 51/20
[52] U.S. Cl. ..................................... 188/216; 188/341
[58] Field of Search .................... 188/78, 205 A, 216, 188/325, 326, 327, 328, 329, 330, 331, 332, 333, 335, 340, 341

[56] References Cited

U.S. PATENT DOCUMENTS

| | | | |
|---|---|---|---|
| 1,856,070 | 5/1932 | Dodge | 188/332 |
| 2,475,492 | 7/1949 | Goepfrich et al. | 188/326 |
| 2,509,643 | 5/1950 | House | 188/328 |
| 2,945,564 | 7/1960 | House et al. | 188/328 |

FOREIGN PATENT DOCUMENTS

| | | | |
|---|---|---|---|
| 2012833 | 9/1971 | Fed. Rep. of Germany | 188/327 |
| 1438924 | 4/1966 | France | 188/216 |
| 1464623 | 11/1966 | France | 188/341 |

Primary Examiner—Edward R. Kazenske
Attorney, Agent, or Firm—Browdy and Neimark

[57] ABSTRACT

A drum brake used in a vehicle generally includes a backing plate secured to a non-rotatable member of a wheel shaft; a pair of brake shoes slidably attached to the backing plate; a wheel cylinder disposed between one end of each brake shoe, where they are closely positioned to each other; an anchor disposed between the other end portion of each brake shoe where they are again closely positioned to each other, and having an anchor block on which each end portion of the brake shoes abuts and an anchor bracket secured on the anchor block for protecting each brake shoe from swinging out; and a substantially U-shaped return spring engaged with each web portion of the brake shoes for biasing the shoes in a mutually approaching direction. The anchor bracket in the abovementioned drum brake is characteristically provided with a supporting portion or portions integrally formed therewith, in order to retain the U-shaped return spring about the central portion thereof for the purpose of restraining the rattling of the same.

3 Claims, 7 Drawing Figures

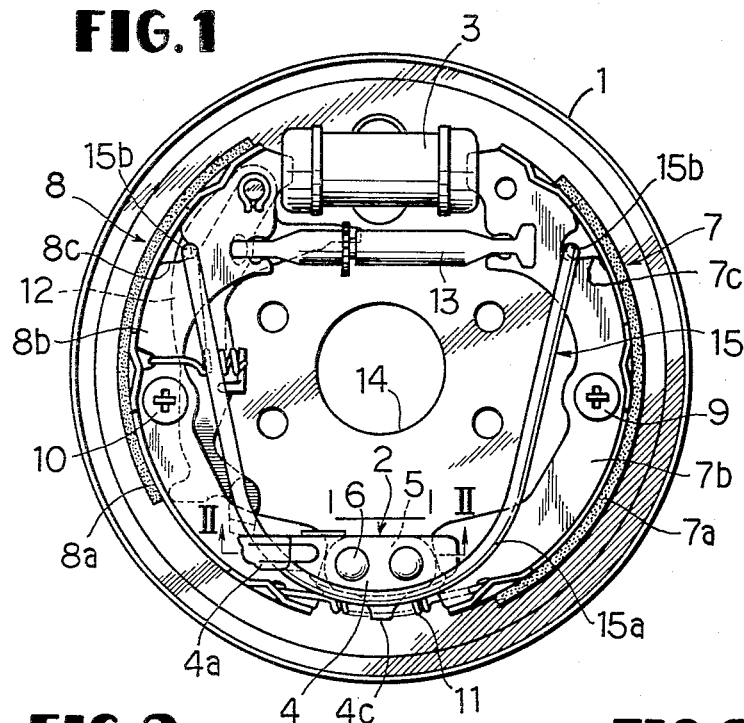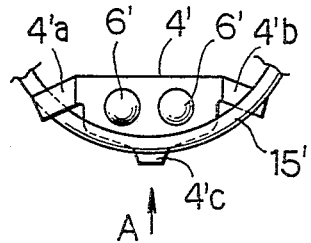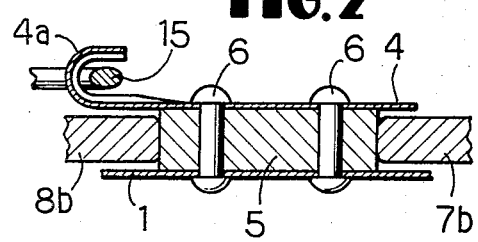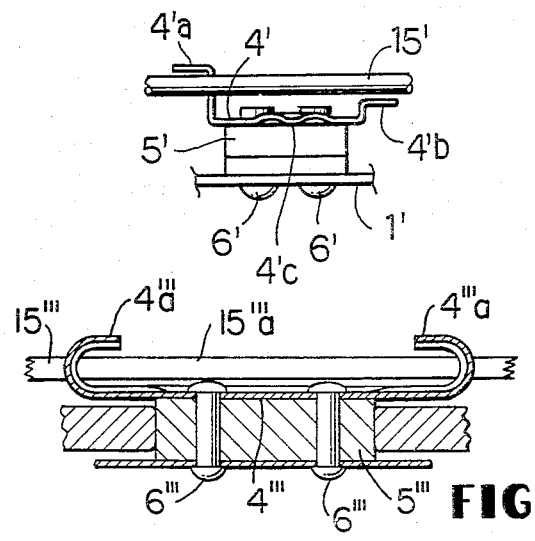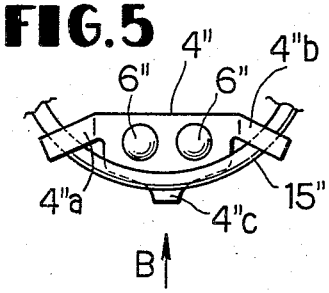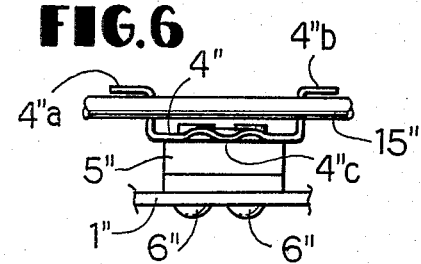

RETURN SPRING RETENTION FOR A VEHICLE DRUM BRAKE

This is a continuation of application Ser. No. 845,612 filed Oct. 26, 1977, now abandoned.

BACKGROUND OF THE INVENTION

This invention relates to an improvement of a drum brake for vehicle use. More particularly it is aimed at the effective retention of a substantially U-shaped return spring, used in an automotive drum brake being anchored between a pair of brake shoes (hereinafter simply called shoe), by means of an ingenious use of a brake component member, for the purpose of reducing or eliminating rattles of the return spring, i.e., prevention of undesirable noises.

In a drum brake, wherein a pair of crescent-shaped shoes with a lining attached thereon are slidingly urged, by actuation of a wheel cylinder disposed between one end portion of each shoe, onto a drum which rotates with a wheel to brake the vehicle, the pair of shoes which have been contacting the drum must be rapidly and positively retracted therefrom as soon as the actuating force of the cylinder disappears. For this purpose a return spring is anchored between the pair of shoes in order to bias the same, by means of the elasticity of the spring, in a direction of withdrawing them from the drum, i.e., in a direction of drawing them toward each other.

As a return spring for this purpose, a substantially U-shaped spring made of a rigid wire rod is used, as opposed to a coil type spring. Particularly in case of a small type drum brakes a U-shaped return spring is preferable to a coil spring because of its considerably free choice of positioning without fear of being affected by other brake component members.

Because the return spring is engaged only at the end portion of the shoes, the central curved or loop portion of the spring is liable to move irregularly or rattle due to vibration of the vehicle or other causes thereby hitting other brake component members and giving rise to a so called rattling sound in the brake system or some other undesirable sound. It is also a serious problem that as a result of such rattling the return spring may contact the brake drum which is rotating in confrontation therewith, thereby increasing the wear and reducing the effectiveness of both the return spring and the brake drum. Because of the difficulty of mounting a suitable means to restrain the rattling within the considerably narrow space of the brake system, no effective means has been found in the prior art to control this problem.

Although a device for retaining the return spring by means of a hair pin spring disposed at a central portion of the return spring has been disclosed in U.S. Pat. No. 3,853,207, it is a shoe hold down spring (a spring which is engaged with the end straight line portion of the return spring), rather than the hair pin spring, that is really effective in the retention or cramping down of the return spring. Even this patented construction of the return spring still contains various problems such as:

(1) The U-shaped return spring is kept down or held down onto the shoe webs, resulting in rubbing and the consequent deterioration of the spring function.

(2) The hair pin spring in that patent is separately made and attached to each shoe, thereby increasing the number of component members, raising the manufacturing cost, and complicating the assembling operation.

To overcome such shortcomings, after having made many studies on the retention of the U-shaped return spring, the inventor thought of controlling the movement of the U-shaped return spring by utilizing a part of the anchor present in the type of drum brake wherein the pair of shoes abut on an anchor at the end portions thereof opposite the end portions actuated by the wheel cylinder. The curved or loop portion of the U-shaped return spring is placed on the anchor.

After further study the conclusion was reached for solving the various problems, of the prior art by which a part of an anchor bracket, which is an anchor component member which is flexible or adaptable for being formed into several shapes is formed into a return spring supporter; consequently the rattling of the spring is controlled, the wearing of the spring is eliminated, and the increase of component members is completely avoided.

SUMMARY OF THE INVENTION

It is therefore a primary object of this invention to provide a supporting device for a return spring of the brake shoes in a drum brake.

It is another object of this invention to provide a supporting device for a substantially U-shaped return spring, anchored between a pair of shoes, by ingeniously utilizing a part of an anchor component member, which device is capable of reducing or eliminating the rattles of the spring, consequently preventing various undesirable noises.

It is still another object of this invention to provide a supporting device for a return spring which does not increase the number of brake component members, does not increase the manufacturing cost, and largely eliminates friction caused by contact with other brake component members.

Other objects and advantages of this invention will be apparent from the study of the following detailed description in conjunction with the accompanying drawings.

The outstanding features of this invention can be summarized as follows:

A drum brake including
- a backing plate secured to a non-rotating member of a wheel shaft;
- a pair of brake shoes slidably attached to the backing plate;
- a wheel cylinder disposed between each one end portion of the shoes, where they are positioned closely to each other;
- an anchor, disposed between the other end portion of the pair of shoes, having an anchor block on which each end portion of the pair of shoes abuts, and an anchor bracket secured on the anchor block for preventing the shoes from swinging out; and
- a substantially U-shaped return spring which is engaged with each web portion of the shoes for biasing the same in a mutually approaching direction, characterized by a spring supporting portion that is integrally formed on the anchor bracket about the central part of the return spring for engaging therewith to restrain the rattling thereof.

BRIEF DESCRIPTION OF THE DRAWINGS

FIG. 1 is an elevation of an embodiment in accordance with this invention;

FIG. 2 is an enlarged cross-sectional view taken along the line II—II of FIG. 1;

FIG. 3 is a fractional elevation similar to FIG. 1 of another embodiment;

FIG. 4 is a projection of FIG. 3 seen from A;

FIG. 5 is a fractional elevation similar to FIG. 1 of a third embodiment; and

FIG. 6 is a projection of FIG. 5 seen from B.

FIG. 7 is a variant of the embodiment shown in FIG. 2 in which each end of the anchor bracket is curved.

DETAILED DESCRIPTION OF THE INVENTION

Numeral 1, in FIG. 1, represents a backing plate which is secured to a non-rotating member of a wheel shaft at a position where the shaft confronts an opening of the brake drum (not shown). On the backing plate 1 are secured an anchor 2 and a wheel cylinder 3. The anchor 2 is, in turn, composed of an anchor bracket 4 and an anchor block 5 located thereunder, both being joined with a plurality of rivets 6 passing therethrough to the backing plate 1. A pair of leading and trailing type shoes 7, 8, having a crescent shape, are respectively composed of a lining 7a, 8a and a shoe web 7b, 8b. Both shoes 7, 8 are slidably mounted on the backing plate 1, with a shoe hold down spring assembly 9, 10, respectively. One end portion of the shoes abuts the anchor 2 (specifically on the anchor block) and the other end portion of the shoes abuts the actuating portion of the wheel cylinder 3. The actuation of the wheel cylinder 3 moves the both shoes 7, 8 in a mutually separating direction (left and rightward in the Figure). In addition, reference numerals 11, 12, 13, and 14 designate respectively an anchor spring, a parking lever, a strut, and a hole for inserting a wheel shaft.

A U-shaped return spring 15 is engaged, at each of its hook-like end portion 15b, with an engaging hole 7c, 8c formed on the shoe web 7b, 8b, at a biased portion near the wheel cylinder 3; the curved portion 15a of the U-shaped spring is located in the neighborhood of the anchor 2, for biasing or urging the shoes 7, 8 in the mutually approaching direction.

The anchor 2 in accordance with this invention is, as shown in FIGS. 1 and 2, composed of an anchor block 5, on which each end portion of the shoe webs 7b, 8b abuts, and a plate member 4 (i.e., an anchor bracket having a sufficient size to cover the abutting portion and part of the end portion of the shoe webs 7b, 8b) is provided with a supporting portion 4a on one end part thereof, integrally formed therewith, which is formed by curving that portion upward (in a direction departing from the backing plate) to retain the return spring 15, such that both the plate member 4 and the return spring 15 are attached to the backing plate with a plurality of rivets 6.

Reference numeral 4c denotes a protrusion integrally formed on the anchor bracket 4 for holding down an anchor spring 11.

The U-shaped return spring 15 can be retained in such a way, as shown in FIG. 1, whereby the central curved portion 15a thereof is accommodated in the curved supporting portion 4a of the anchor bracket 4, thereby effectively reducing the rattling of the return spring 15. Although the aforementioned supporting portion 4a is single in number, the anchor bracket 4 may contain a pair of such supporting portions formed integrally on both end portions of the anchor bracket 4 alike (on the left and right end in the Figure), resulting in a more secure retention of the spring, thereby better preventing rattling. The supporting portion 4a defines a pair of restricting surfaces confronting one another inside the curved U-shaped letter portion; these restricting surfaces may be provided with a pair of parallelly elongated ridges on either edge of the U-shaped letter portion of the bracket 4.

In FIGS. 3 and 4, which illustrate another embodiment, an anchor bracket of a different shape, with a pair of return spring supporting portions 4a, is shown. In this case a pair of projected supporting portions 4'a and 4'b, in an inverted L letter form, are integrally formed on either end of the anchor bracket 4', one being higher than the other, for retaining the U-shaped return spring 15' interposed between the two different heights of both supporting portions 4'a, 4'b. As can be seen in FIG. 4 the U-shaped return spring 15' is restrained from its upward movement or swing by the higher supporting portion 4'a and from its downward movement or swing by the lower one 4'b. This can be quite an effective control on the rattling. In FIG. 4, reference numerals 1', 5', 6', and 4'c similarly designate the backing plate, the anchor block, the rivet, and the projection for holding down the anchor spring, respectively.

While in the above-mentioned two embodiments one or two supporting portions are aimed at restraining the upward and downward movements of the spring, i.e., a separating movement from the anchor and an approaching movement to the anchor (see FIGS. 2 and 4 wherein the return spring 15 or 15' is restrained from the upward and the downward movement or swing), a third embodiment shown in FIGS. 5 and 6 is, on the contrary, aimed at restraining the spring only from upward movement, which is also effective for the purpose of preventing rattling, by means of integrally forming a pair of inverted L letter shaped upward projections of substantially identical height, supporting portions 4"a, 4"b, on opposite ends of the anchor bracket, for holding down the spring.

As can be seen in FIG. 6, the return spring 15" is, in this case, prevented from any upward movements because it is suppressed by the supporting portions 4"a, 4"b at the curved portion thereof. The downward movement of the return spring 15" is in this case negligibly small, because the spring 15" rests on the upper surface of the anchor 4", leaving little clearance in between, thereby providing little likelihood of hitting other brake components, or creating strange noises there. Other parts in FIGS. 5 and 6 are identical to those in FIGS. 3 and 4, requiring no description.

In FIG. 7 a portion of a U-shaped return spring, designated 15''', abuts an anchor bracket 4''' and the block 5''' are connected by a pair of rivets 6'''. Both ends of the bracket 4''' are curved to provide spaced apart curved supporting portions 4''' a which accomodate the curved central portion of the return spring 15'''a thereby effectively reducing the rattling of the return spring 15'''.

As described in greater detail above, this invention is aimed at the reduction or elimination of rattling and other undesirable strange noises of the U-shaped return spring by means of integrally forming a supporting portion or a pair of supporting portions on the anchor bracket for preventing the spring from moving in a separating or departing direction from the anchor. This invention has solved various conventional problems such as the rattling of the U-shaped return spring, strange noises in the drum brake, and the hitting of brake component members by the U-shaped return spring, thereby wearing and/or deteriorating the function of the spring. The merit of integrally forming the supporting portion on the anchor bracket is not negligible. It is easy and simple, and therefore economical to manufacture only by a usual pressing, there are no additional attaching member or members, and it can be easily assembled because of its simultaneous assembly with the anchor bracket itself.

This invention can be briefly described, in other words, as an ingenious restraint, with many advantages, of the rattling of the return spring by utilizing the position, and improving the configuration of, the anchor bracket to integrally form the supporting portion or portions thereon for engaging with the spring.

The above few embodiments are disclosed only by way of examples, which should by no means be construed as to limit the scope of the invention to them. Various changes and modifications can be made by those skilled in the art without departing from the spirit of the invention stated in the accompanying claims.

What is claimed is:

1. In a drum brake for vehicle use including:
 a stationary backing plate;
 a pair of brake shoes slidably attached to said backing plate;
 a wheel cylinder secured on said backing plate between first mutually closely positioned end portions of said shoes;
 an anchor secured on said backing plate between second mutually closely positioned end portions of said shoes, said anchor having an anchor block on which each of said second end portions of said shoes abuts and an anchor bracket secured on said anchor block; and
 a substantially U-shaped return spring engaged at each end portion thereof with a respective one of said shoes for biasing both said shoes in a mutually approaching direction and having a central U-shaped curved portion,
 an improvement wherein said anchor bracket is integrally formed with supporting portions formed as a pair on respective lateral ends thereof as respective bent portions, each of L-letter shape in a departing direction from said backing plate, one of said pair of supporting portions being spaced from said backing plate a given distance and forming one restricting surface on its inner side, and the other of said pair of supporting portions being spaced from said backing plate at a distance less than said given distance for forming another restricting surface on its outer side in order to support said spring from either side thereof with a small gap, in cooperation with said one supporting portion, at non-aligned locations, whereby movement of the spring is restrained within a small limitation in a perpendicular direction to a plane including the central U-shaped curved portion, but freely movable in a parallel direction to this plane.

2. A drum brake in accordance with claim 1, wherein said anchor bracket and said anchor block are secured with a plurality of common rivets to said backing plate.

3. A drum brake in accordance with claim 1, wherein said supporting portions support said spring at a laterally offset position from said anchor block.

* * * * *